INVENTOR
Yehuda L. Sandler
BY Daniel P. Cillo
ATTORNEY

United States Patent Office 3,682,707
Patented Aug. 8, 1972

3,682,707
STABILIZATION OF SILVER CATALYST IN AN
AIR DIFFUSION ELECTRODE
Yehuda L. Sandler, Pittsburgh, Pa., assignor to Westinghouse Electric Corporation, Pittsburgh, Pa.
Filed Jan. 12, 1970, Ser. No. 2,156
Int. Cl. H01m 29/04, 27/02
U.S. Cl. 136—86 E     8 Claims

ABSTRACT OF THE DISCLOSURE

An electrochemical cell, comprising an anode, a gas diffusion cathode containing silver catalyst, and an aqueous electrolyte between the anode and cathode to which is added at least 0.01 mole of either carbonate, phosphate or chloride ions per liter of electrolyte, is used to cause current to flow externally through a load circuit connecting the anode and cathode.

BACKGROUND OF THE INVENTION

This invention relates to the operation of electrochemical cells, such as fuel cells, hybrid metal-gas cells and batteries which contain positive and negative electrodes at least one of which is a silver catalyzed gas diffusion electrode or other type silver electrode in contact with an aqueous electrolyte. More particularly, this invention pertains to electrolyte additives that are soluble in commonly used electrolytes, in such cells to stabilize the silver catalyst in the electrodes.

Fuel cells are electrochemical devices which convert the chemical energy in a fuel directly into electrical energy by the oxidation of fuel supplied to the cell. The fuel cell is generally composed of two gas diffusion electrodes adjacent to and in contact with an electrolyte, with means for supplying a fuel to the negative electrodes and an oxidant to the positive electrode.

A gas diffusion electrode is also used in hybrid batteries. In these, the diffusion electrode is generally fed with air or oxygen and is paired with a metal electrode. On discharge, the chemical energy of oxidation of the metal is converted into electrical energy.

In the gas diffusion electrode, gas penetrates by diffusion to a three-phase zone which is a narrow electrochemically active zone where the gas, liquid electrolyte and the solid particles of the electrode meet. A catalyst is usually used to accelerate the electrode reaction. Silver is often used in the gas diffusion electrode because of its high catalytic activity and availability at relatively low cost as compared to other efficient catalysts such as platinum. The catalyst is most effective when it is located only at the active electrode-electrolyte interface where the alkaline electrolyte and gas meet.

A common weakness of electrodes containing a silver catalyst is the solubility of the silver in commonly used aqueous electrolytes. This drainage of catalyst is expensive and has a definite deleterious effect on long run operation of the electrochemical cell.

SUMMARY OF THE INVENTION

Briefly, the above problems are solved by the addition of additive compounds, soluble in the electrolyte to provide ions which decrease the solubility of silver in the electrolyte, for example, carbonate, phosphate or chloride ions. Heretofore, it had always been thought advantageous to use highly purified electrolyte in the operation of such cells, but I have concluded that these particular ions will cause a strong decrease in the solubility of the silver catalyst in the electrolyte without a corresponding poisoning of the electrode or reduction in output during operation of the cell.

BRIEF DESCRIPTION OF THE DRAWING

For a better understanding of the nature of the invention, reference will be made throughout the specification to the exemplary embodiment shown in the accompanying drawings, in which.

DESCRIPTION OF THE PREFERRED EMBODIMENTS

Figure 1:
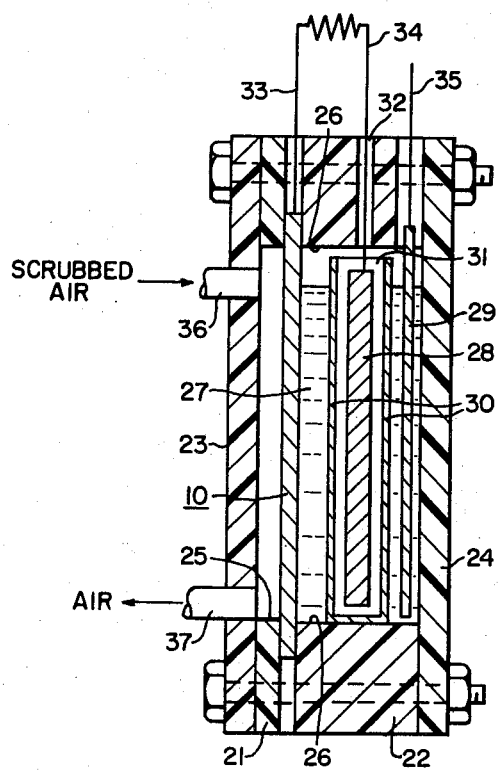
FIG. 1 is a schematic view showing a hybrid battery containing an electrolyte, a metal electrode and a gas diffusion electrode containing silver catalyst.

FIG. 1 shows a gas electrode in a metal-air battery. The gas diffusion electrode 10 is mounted between a pair of frame members 21 and 22 which are disposed between end plates 23 and 24. An air chamber 25, is provided between the end plate 23 and the electrode 10. Likewise, a chamber 26 is provided between the electrode 10 and the end plate 24. This chamber is filled with electrolyte 27 such as aqueous NaOH, to which is added at least 0.01 mole of carbonate, phosphate or chloride ions per liter of electrolyte in accordance with my invention. Other electrolytes in commonly used concentrations, for example, 30 weight percent aqueous KOH, may also be used. An electrode 28 and a charging electrode 29 (for recharging the battery) are disposed in the chamber 26 and within the electrolyte. The electrode 28 is composed of an oxidizable metal such as iron, cadmium or zinc. The charging electrode 29 is composed of an inert metal such as nickel. The electrode 28 is encased in an envelope 30 having an open top 31. The envelope serves as a separator and may be made of sheets of fibrous polypropylene. The air electrode is positive with respect to the metal electrode. When charging, the charging electrode is made positive with respect to the metal electrode.

A vent 32 in the frame member 22 is provided to permit the escape of gases from the electrodes 28 and 29 when charging. Wire leads 33, 34 and 35 extend from the electrodes 10, 28 and 29 respectively. During operation, current will flow externally when a load circuit is connected between leads 33 and 34. An air inlet 36 and an air outlet 37 are provided in the end plate 23.

The preferred gas diffusion electrode is that taught by Sandler and Durigon in U.S. Ser. No. 776,636, filed on Nov. 18, 1968 now abandoned, and assigned to the assignee of this invention. The gas electrode 10 can comprise a coherent porous body and a porous electrical conductor. The electrical conductor can be wire mesh, perforated metal sheet or a compressed fiber metal member preferably composed of nickel that is either unplated, or plated with a noble metal when used as an oxygen electrode. The porous body can be made of particles of conducting metal or a conducting carbonaceous material inert to the electrolyte such as carbon, graphite, boron carbide and mixtures thereof, which is held together by a resinous hydrophobic hydrocarbon, halogenated hydrocarbon or fluorocarbon binder inert to the electrolyte. A preferred binder is polytetrafluoroethylene.

In addition, a filler such as fibrous potassium titanate may be added to improve the mechanical strength or diffusion characteristics of the electrode. Silver catalyst is added in an amount varying from about 0.1 to 10 milligrams per square cm. of geometric active electrode area, usually in the form of a silver salt such as silver nitrate (which is decomposed by heating or use in the cell).

In the preferred form, a backing layer and a gas entrance side layer containing the catalyst will be bonded together and to opposite sides of an electrical conductor. The seat of electrochemical activity is a narrow zone within the gas electrode 10 where the electrolyte and gas meet.

This reaction zone is where most of the silver catalyst should be concentrated and should be close to the gas chamber of the electrochemical cell. The advantage of positioning the reaction zone close to the gas phase is the short diffusion path for the gas and the resulting high output.

My preferred electrolyte additive is a carbonate. The carbonate ions when added in high enough concentration as a soluble compound to commonly used aqueous alkaline electrolytes, cause a strong decrease in the solubility of the silver, without poisoning or causing a decline in output of the active oxygen electrode. I found that the presence of carbonate, added as $K_2CO_3$, in 30 percent aqueous KOH electrolyte, in concentrations as high as 1 mole of carbonate ion per liter of electrolyte, did not affect the electrical output of the electrode unfavorably.

The solubility of silver-carbonate salts is very low. For example, in water at 25° C.: The Solubility Product:

$$K_{sp} = [Ag^+]^2[CO_3^{2-}] = 6 \times 10^{-12}$$

Here the brackets designate the concentration in moles per liter. When $[CO_3^{2-}]$ is added to the electrolyte in the form of a soluble compound, such as $K_2CO_3$, $Na_2CO_3$, $Li_2CO_3$, $Cs_2CO_3$ or other carbonate that will dissolve and provide $CO_3^{2-}$ ions in suitable aqueous alkaline electrolyte, the concentration of $Ag^+$ ion in solution is reduced correspondingly as the equation above shows. In concentarted alkaline solution the actual situation is more complex and not completely understood. In concentrated alkaline solution, the major species is $Ag(OH)_2^-$ ion the amount of which at constant $OH^-$ ion concentration, is proportional to $[Ag^+]$; also the solubility product in that case must be different from the product in pure water.

Other additive ions that may be used in suitable aqueous alkaline electrolyte without poisoning the silver in the electrodes in electrochemical cells are phosphate ions $(PO_4^{3-})$, added in the form of a soluble compound such as $H_3PO_4$, $K_3PO_4$ and $Na_3PO_4$. Chloride ions $(Cl^-)$, may be added in the form of a soluble compound such as KCl, NaCl, CsCl and LiCl.

The carbonate, phosphate chloride ions can be added in the form of soluble compounds to suitable aqueous alkaline electrolytes such as aqueous solutions of KOH and NaOH in the range from at least 0.01 mole of ion or compound/liter of electrolyte to saturation, with a preferred range of from about 0.05 to 0.5 mole of the ion or compound added per liter of electrolyte. At above about 1 mole/liter of these ions, saturation can occur in concentrated alkaline electrolytes, especially within gas diffusion electrodes because of the increased $OH^-$ ion concentration at high currents. This can cause the pores to clog up. Below the addition of 0.01 moles/liter of these ions, relatively little advantage is attained.

Other ions, such as bromide, iodide and sulfide have not been found suitable due to poisoning of the silver catalyzed gas diffusion electrode by, it is thought, the strong absorption of these ions on the silver catalyst. This results in a decrease in performance of the electrochemical cell.

Figure 2:
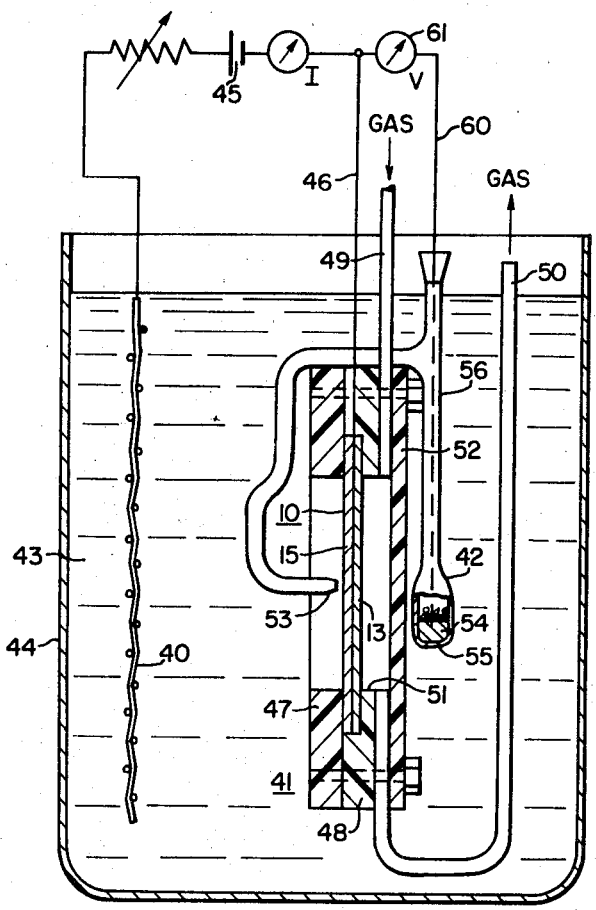
FIG. 2 shows an electrode testing device used in the examples.

The electrode 10 was tested against an inert counterelectrode 40 in a driven circuit, such as shown in FIG. 2, for which purpose it was placed in an electrode holder 41, in conjunction with a reference electrode 42.

As shown in FIG. 2, the assembly of the electrode holder 41 and the electrode 10 is immersed in an electrolyte 43, such as aqueous NaOH or KOH, containing the addition of carbonate, phosphate or chloride ions to the electrolyte in the range between about 0.01 and 1 mole/liter of electrolyte in accordance with my invention. A counter electrode 40, composed of a metal mesh such as platinum or nickel, is likewise immersed in the additive containing electrolyte 43 which is contained in container 44. The cell including the electrodes 10 and 40 in the electrolyte 43 is driven by a 12 volt battery 45 for testing with the electrode 10 connected to the circuit by a lead wire 46, which extends between the interfaces of the frame member 47 and the portions 48, and which is connected to the upper end of the grid conductor 15 which generally runs through the electrode 10 between a backing layer and a gas side layer 13 of conducting material.

The electrode holder 41 is provided with an inlet tube 49 and an outlet tube 50 which communicate with the portion of the opening 51 between the plate portion 52 and the electrode 10, whereby the active gas such as oxygen is in contact with the catalyzed gas entrance side layer 13 within the electrode 10.

The Hg/HgO reference electrode 42 is used in conjunction with a Luggin capillary having an opening 53 which is located about two mm. from the surface of the electrode 10, in order to measure the potential of the electrode against a point in the electrolyte located close to the electrode 10. The electrode 42 includes a mercury/mercury oxide mixture 54 located in a glass bulb 55 that communicates via inverted U-shaped glass tube 56 with the Luggin capillary opening 53 on the electrolyte side of the electrode 10. The tube 56 is filled with electrolyte 43. The tube 56 is U-shaped to facilitate attachment of the electrode 42 and the electrode holder 41. A platinum wire 60 leads from the Hg/HgO mixture 54 to one side of a high impedance, voltmeter 61, the other side of which is connected to the electrode 10. When air is used as an active gas, the air before entering the device is preferably scrubbed by passing it through an alkaline solid absorbent or an alkaline solution. This removes the carbon dioxide from the air which reacts with the electrolyte and tends to destroy the structure of the electrode by forming deposits in the pores. Other impurities like $SO_2$ are simultaneously removed which may poison the catalyst.

The following examples illustrate the practice of the invention.

EXAMPLE 1

A circular gas diffusion electrode was prepared having a total active surface area of about 20 square centimeters and a total thickness of about 24 mils. A backing layer was made from 175 mg. of conducting acetylene carbon black (sold by Shawinigan Products Co.) and an aqueous emulsion containing 25 mg. of finely divided polytetrafluoroethylene (sold under the trade name Teflon 30 TFE Emulsion by E.I . DuPont). The carbon and Teflon emulsion were mixed with sufficient water to form a stiff paste and then spread over one side of an expanded silver plated nickel mesh to form a backing layer. The mesh contained about 1 mg. of silver plating/sq. cm. of mesh.

The subassembly of the mesh and backing layer was inerted and a catalyzed carbon-Teflon layer was applied to the other side of the mesh. This layer was composed of 80 mg. of conducting carbon black and an aqueous emulsion of TFE 30 containing 35 mg. of finely divided polytetrafluoroethylene. Silver nitrate was then added so to give about 0.6 mg. of silver on the carbon as a catalyst/sq. cm. of electrode area. Sufficient water was added to the mixture and it was similarly applied to the electrical conducting net to form the catalyzed gas entrance side layer. The electrode was then compacted and passed through a pair of rollers to evenly distribute the layers and press out excess water. Subsequently the electrode was slowly heated in air to about 350° C. in a furnace and hot pressed under a 2000 pound load at about 280° C. A porous hydrophobic layer was then hot pressed at a 2000 pound load onto the catalyzed carbon-Teflon layer to help prevent electrolyte leakage into the air side of the cell.

The electrode was tested in the "driven" cell shown in FIG. 2 of the drawings and described in the specification. The catalyzed layer faced the gas side as shown in FIG.

2. The cell was operated in scrubbed air ($CO_2$ free) at room temperature (25° C.).

The electrolyte was standard 30 weight percent aqueous KOH (analytical grade) to which was added 0.1 mole of $K_2CO_3$ per liter of electrolyte to give the addition of 0.1 mole of $CO_3^{2-}$ iron per liter of electrolyte.

The cell was operated at room temperature for about 1 year. During the first 3 months it was operated continuously at 100 ma./sq. cm. current density. In order to accelerate the test, the cell was then left at open circuit for most of the remaining 9 months. As is well known the rate of silver dissolution strongly increases as the electrode potential is increased. Consequently, at open circuit a higher rate of silver dissolution is expected to occur. In spite of this, due mostly to the added carbonate, little change in performance was found throughout the year, when the cell was tested at 100 ma./sq. cm. current density. The high performance may also be due, in part, to improvement of the electrode with time because of electrode swelling. The voltage after 36 days was —0.14 volt, after 262 days it was —0.11 volt and after 365 days the voltage was —0.15 volt as measured in all cases against a Hg/HgO reference electrode in the same electrolyte.

After 365 days the amount of silver catalyst on the carbon decreased from 0.6 mg./sq. cm. of active electrode area to 0.12 mg./sq. cm. as determined by wet chemical analysis of the electrode material, and the amount of silver on the mesh decreased from 1.0 mg./sq. cm. to 0.5 mg./sq. cm. At the beginning of the test the electrode contained about 20 mg. of silver on the mesh and about 12 mg. of silver on the carbon. After 365 days, the electrode contained about 10 mg. of silver on the mesh and 2.4 mg. of silver on the carbon. Thus 19.6 mg. of silver was dissolved into the electrolyte over 365 days.

EXAMPLE 2

Gas diffusion electrodes were prepared as in Example 1, containing 0.6 mg./sq. cm. of silver on carbon as a catalyst. The electrodes were tested in the "driven" cell shown in FIG. 2 of the drawings and described in the specification. The electrolyte was 30 weight percent aqueous KOH and the cell was operated in scrubbed air ($CO_2$ free) at 25° C.

Experiments were performed to see the short range effects of $K_2CO_3$, KCl, $H_3PO_4$, NaBr and KI additives on these gas diffusion electrodes. I found that no voltage drop due to electrode poisoning occurred with 1.0 mole of added carbonate, chloride or phosphate ions per liter of electrolyte. Addition of bromide ion at 0.1 mole per liter of electrolyte caused an immediate drip of about 0.02 volt at 100 ma./sq. cm. current density and the addition of iodide ion at 0.1 mole per liter of electrolyte caused an immediate 0.05 volt drop at 100 ma./sq. cm. current density.

This indicates that only certain ions can be used as additives in aqueous alkaline electrolytes with silver catalyzed gas diffusion electrodes to decrease the loss of silver into the electrolyte without causing electrode poisoning and consequent power loss in the cell.

EXAMPLE 3

A gas diffusion electrode was prepared as in Example 1, but without the hydrophobic layer and containing gold plated nickel mesh instead of silver plated nickel mesh. The electrode was tested in the "driven" cell shown in FIG. 2 of the drawings and described in the specification. The electrolyte was 30 weight percent aqueous KOH (analytical grade) and the cell was operated in scrubbed air ($CO_2$ free) at 25° C. for 14 days.

No carbonate or other additive was added to the electrolyte.

The cell was left at open circuit, except for measuring the performance at certain intervals. The voltage as measured against a Hg/HgO reference electrode in the same electrolyte at 100 ma./sq. cm. of projected electrode area dropped rapidly. It was —0.160 volt after the first day at open circuit, —0.186 volt after the fourth day and —0.201 volt after the eleventh day.

Chemical wet analysis of the electrode material was carried out after the 14th day to determine the silver loss from the carbon by dissolution in the electrolyte. After 14 days the amount of silver catalyst on the carbon decreased from 0.6 mg./sq. cm. of active electrode area to 0.24 mg./sq. cm. At the beginning of the test the electrode contained about 12 mg. of silver on the carbon. After 14 days the electrode contained about 4.8 mg. of silver on the carbon. Thus as much as, 7.2 mg. of silver was dissolved into the electrolyte over only 14 days.

This rapid decrease of silver catalyst and electrode performance should be compared to the slow rate of silver dissolution and essentially constant voltage in Example 1, where carbonate was added to the electrolyte.

As a comparison of catalyzed vs. non-catalyzed electrodes values for the best carbon-gold plated nickel mesh electrodes of similar size and make up as the electrodes of Example 1 but without silver catalyst was —0.227 volt after 3 days in the "driven" cell of FIG. 2 operating in scrubbed air and 30 weight percent aqueous KOH at 25° C. as measured against a Hg/HgO reference electrode at 100 ma./sq. cm.

I claim as my invention:

1. A method of operating an electrochemical cell having an anode, an aqueous alkaline hydroxide electrolyte, and a cathode, said cathode being a gas diffusion electrode containing silver catalyst and having a gas entrance side wherein a gas is fed into the gas diffusion electrode with electrolyte permeating the opposite side, said cell being used for causing current to flow externally through a load circuit connecting the anode and cathode, and wherein an additive ion selected from the group consisting of carbonate, phosphate and chloride ion is present in the electrolyte, the said additive ion having a concentration of from 0.01 to 1.0 mole of said ion per liter of electrolyte and stabilizing the silver catalyst in the gas diffusion electrode.

2. The method of operating the electrochemical cell of claim 1 wherein carbonate ions are added to the electrolyte in the form of a soluble compound selected from the group consisting of $K_2CO_3$, $Na_2CO_3$, $Cs_2CO_3$ and $Li_2CO_3$, phosphate ions are added to the electrolyte in the form of a soluble compound selected from the group consisting of $H_3PO_4$, $K_3PO_4$ and $Na_3PO_4$ and chloride ions are added to the electrolyte in the form of a soluble compound selected from the group consisting of KCl, NaCl, CsCl and LiCl, said additive ions having a concentration of from 0.05 to 0.5 moles of said ion per liter of electrolyte.

3. The method of operating the electrochemical cell of claim 1 wherein the cathode comprises a coherent porous body having a gas entrance side and an electrolyte-contacting side and containing an electrical conductor, the porous body consisting essentially of a conducting material inert to the electrolyte and of a resinous binder inert to the electrolyte and including silver catalyst in the range of about 0.1 to 10 mg. per sq. cm. of electrode area and wherein the gas is selected from the group consisting of oxygen and scrubbed air.

4. The method of operating the electrochemical cell of claim 3 wherein the porous body contains a porous electrical conductor and consists of a backing layer and a gas entrance side layer, the backing layer and the gas entrance side layer being bonded together and to opposite sides of the electrical conductor, each comprising particles of a conducting material inert to the electrolyte and of a resinous binder inert to the electrolyte, the gas side including a silver catalyst and wherein an ion selected from the group consisting of carbonate, phosphate and chloride is added to the electrolyte in a concentration of from 0.05 to 1.0 mole of said ion per liter of electrolyte.

5. The method of operating the electrochemical cell of claim 4 wherein the conducting material particles are carbonaceous particles selected from the group consisting of carbon, graphite, boron carbide and mixtures thereof and the resinous hydrophobic binder is selected from the group consisting of hydrocarbons and halogenated hydrocarbons.

6. The method of operating the electrochemical cell of claim 4 wherein carbonate ion is added to aqueous KOH electrolyte in a concentration of from 0.05 to 0.5 mole of said ion per liter of electrolyte.

7. An electrochemical cell having an anode, an aqueous alkaline hydroxide electrolyte and a cathode, said cathode being a gas diffusion electrode containing silver catalyst and having a gas entrance side wherein a gas is fed into the gas diffusion electrode with electrolyte permeating the opposite side, and wherein the electrolyte contains the addition, in the form of a soluble compound, of from at least 0.01 to 1.0 mole per liter of electrolyte of an additive ion selected from the group consisting of carbonate, phosphate and chloride to stabilize the silver catalyst in the gas diffusion electrode, said cell being used for causing current to flow externally through a load circuit connecting the anode and cathode.

8. The electrochemical cell of claim 9 wherein the cathode comprises a coherent porous body having a gas entrance side and an electrolyte-contacting side and containing an electrical conductor, the porous body consisting essentially of a conducting material inert to the electrolyte and of a resinous binder inert to the electrolyte and including silver catalyst in the range of about 0.1 to 10 mg. per sq. cm. of electrode area and wherein the electrolyte contains carbonate added in the form of a soluble compound selected from the group consisting of $K_2CO_3$, $Na_2CO_3$, $Cs_2CO_3$ and $Li_2CO_3$ phosphate added in the form of a soluble compound selected from the group consisting of $H_3PO_4$, $K_3PO_4$ and $Na_3PO_4$ and chloride added in the form of a soluble compound selected from the group consisting of KCl, NaCl, CsCl and LiCl, said compounds being added in a concentration of from 0.05 to 1.0 mole per liter of electrolyte.

References Cited

UNITED STATES PATENTS

| | | | |
|---|---|---|---|
| 3,132,972 | 5/1964 | Ludwig | 136—86 R |
| 3,134,697 | 5/1964 | Niedrach | 136—86 |
| 3,082,282 | 3/1963 | Gruneberg | 136—86 E |
| 3,446,674 | 5/1969 | Giner | 136—86 |

FOREIGN PATENTS

| | | | |
|---|---|---|---|
| 1,037,631 | 8/1966 | Great Britain | 136—86 E |
| 855,653 | 12/1960 | Great Britain | 136—155 |

ALLEN B. CURTIS, Primary Examiner

U.S. Cl. X.R.

136—86 A, 154, 155